(12) United States Patent
Lin

(10) Patent No.: US 8,191,877 B2
(45) Date of Patent: Jun. 5, 2012

(54) TORSION SPRING AND LAMP HAVING THE SAME

(75) Inventor: Chang-Hsing Lin, Taipei County (TW)

(73) Assignees: Kinpo Electronics, Inc., Taipei County (TW); Cal-Comp Electronics & Communications Company Limited, Taipei (TW)

( * ) Notice: Subject to any disclaimer, the term of this patent is extended or adjusted under 35 U.S.C. 154(b) by 398 days.

(21) Appl. No.: 12/413,092

(22) Filed: Mar. 27, 2009

(65) Prior Publication Data
US 2010/0213654 A1 Aug. 26, 2010

(30) Foreign Application Priority Data
Feb. 26, 2009 (TW) .............................. 98106168 A

(51) Int. Cl.
*F16F 1/14* (2006.01)
(52) U.S. Cl. ........ 267/154; 267/157; 362/444; 362/362; 362/440
(58) Field of Classification Search .................. 362/362, 362/364, 365, 440, 444; 267/157, 154
See application file for complete search history.

(56) References Cited

U.S. PATENT DOCUMENTS

| | | | | |
|---|---|---|---|---|
| 6,422,547 B1 * | 7/2002 | Gibbens | ..................... | 267/157 |
| 7,722,227 B2 * | 5/2010 | Zhang et al. | ................... | 362/364 |
| 2006/0164844 A1 * | 7/2006 | To | ................................... | 362/382 |
| 2009/0034261 A1 * | 2/2009 | Grove | ........................... | 362/294 |
| 2009/0147517 A1 * | 6/2009 | Li et al. | ...................... | 362/249.02 |
| 2009/0161370 A1 * | 6/2009 | Johnson | ........................ | 362/373 |

FOREIGN PATENT DOCUMENTS

TW M348183 1/2009

OTHER PUBLICATIONS

"Office Action of Taiwan counterpart application", issued on May 24, 2011, p. 1-p. 4.

* cited by examiner

*Primary Examiner* — Evan Dzierzynski
(74) *Attorney, Agent, or Firm* — J.C. Patents

(57) ABSTRACT

A lamp includes a shell with an assembling portion, a main body disposed in the shell, and a torsion spring. The torsion spring includes a spring body, a first supporting part, and a second supporting part. The spring body is assembled to the assembling portion. The first supporting part includes a first arm connected to an end of the spring body, a second arm near another end of the spring body and a first bending part connected between the first supporting part and the second supporting part. A structure of the second supporting part is similar to that the first supporting part and is connected to the spring body. The first supporting part and the second supporting part are suitable for tightly clamping the assembling portion and a fixing end respectively by the force of the spring body.

14 Claims, 4 Drawing Sheets

TORSION SPRING AND LAMP HAVING THE SAME

CROSS-REFERENCE TO RELATED APPLICATION

This application claims the priority benefit of Taiwan application serial no. 98106168, filed Feb. 26, 2009. The entirety of the above-mentioned patent application is hereby incorporated by reference herein and made a part of specification.

BACKGROUND OF THE INVENTION

1. Field of the Invention

The present invention is related to a spring element and a lamp having the same, and particularly to a torsion spring and a lamp having the same.

2. Description of Related Art

Fluorescent lamps and incandescent lamps are commonly-used conventional lamps. As the light emitting efficiency of light emitting diode (LED) continues to advance, LED gradually substitutes fluorescent lamps and incandescent lamps to be used for illumination. Compared with the traditional bulbs, LED has great advantages, such as smaller size, longer lifespan, drivable by low voltage/current, non-fragile, mercury-free (no pollution problem), favorable light emitting efficiency (power saving), and so forth.

Lamps for interior illumination are usually fixed to the fixing ends (ceiling or wall, for example) in buildings by the force of the torsion springs provided with the lamps. Generally, a conventional torsion spring has a spring body and two spring arms connected to two sides of the spring body. When a lamp is fixed to a fixing end in the building, the two spring arms are used for clamping the shell of the lamp and the fixing end of the building. The spring arms are long thin structures connected to the end of the spring body and may be easily deformed under stress concentration. Such a structure is unstable. In addition, the assembly of the torsion spring having this kind of structure is comparatively difficult and requires fixtures, which takes more time.

SUMMARY OF THE INVENTION

The present invention provides a torsion spring which has higher structural strength and is adapted for assembly.

The present invention provides a lamp having a torsion spring which has higher structural strength and is adapted for assembly.

The present invention provides a torsion spring adapted for fixing a shell onto a fixing end. The shell includes an assembling portion. The torsion spring includes a spring body, a first supporting part, and a second supporting part. The spring body has a first end portion and a second end portion opposite to the first end portion and is assembled to the assembling portion. The first supporting part includes a first arm, a first bending part, and a second arm. The first arm is extended from the first end portion of the spring body. The first bending part is extended from an end of the first arm that is away from the spring body. The second arm is extended from an end of the first bending part, which is away from the first arm, to the second end portion of the spring body. The second supporting part includes a third arm, a second bending part, and a fourth arm. The third arm is extended from the second end portion of the spring body. The second bending part is extended from an end of the third arm that is away from the spring body. The fourth arm is extended from an end of the second bending part, which is away from the third arm, to the first end portion of the spring body. When the fixing end and the assembling portion of the shell are positioned between the first and the second supporting parts, the first arm and the second arm tightly clamp the assembling portion by the force of the spring body, and the third arm and the fourth arm tightly clamp the fixing end by the force of the spring body as well.

The present invention provides a lamp which is adapted to be fixed to a fixing end and includes a shell, a main body, and a torsion spring. The shell includes an assembling portion. The assembling portion has a notch and two protrusions extending from two opposite inner sides of the notch. The main body is disposed inside the shell. The torsion spring includes a spring body, a first supporting part, and a second supporting part. The spring body has a first end portion and a second end portion opposite to the first end portion, and is assembled to the shell by the first end portion and the second end portion respectively fitting the two protrusions. The first supporting part includes a first arm, a first bending part, and a second arm. The first arm is extended from the first end portion of the spring body. The first bending part is extended from an end of the first arm that is away from the spring body. The second arm is extended from an end of the first bending part, which is away from the first arm, to the second end portion of the spring body. The second supporting part includes a third arm, a second bending part, and a fourth arm. The third arm is extended from the second end portion of the spring body. The second bending part is extended from an end of the third arm that is away from the spring body. The fourth arm is extended from an end of the second bending part, which is away from the third arm, to the first end portion of the spring body. When the fixing end and the assembling portion of the shell are positioned between the first and the second supporting parts, the first arm and the second arm tightly clamp the assembling portion by the force of the spring body, and the third arm and the fourth arm tightly clamp the fixing end by the force of the spring body as well.

In one embodiment of the present invention, the aforementioned first arm and second arm are substantially parallel to each other and substantially perpendicular to the first bending part.

In one embodiment of the present invention, the aforementioned third arm and fourth arm are substantially parallel to each other and substantially perpendicular to the second bending part.

In one embodiment of the present invention, the first supporting part further includes an extending arm connected to an end of the second arm that is away from the first bending part, and the extending arm extends from the second end portion of the spring body into the spring body.

In one embodiment of the present invention, the aforementioned extending arm is substantially perpendicular to the second arm.

In one embodiment of the present invention, the second supporting part further includes an extending arm connected to an end of the fourth arm that is away from the second bending part, and the extending arm extends from the first end portion of the spring body into the spring body.

In one embodiment of the present invention, the aforementioned extending arm is substantially perpendicular to the fourth arm.

Based on the above, the torsion spring in the lamp of the present invention has two supporting parts which respectively have two arms for balancing the load of stress and thus provides higher structural strength. In addition, each of the supporting parts has two arms that can be easily and directly pulled open by the user, which facilitates the assembly of the lamp.

To make the above features and advantages of the present invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
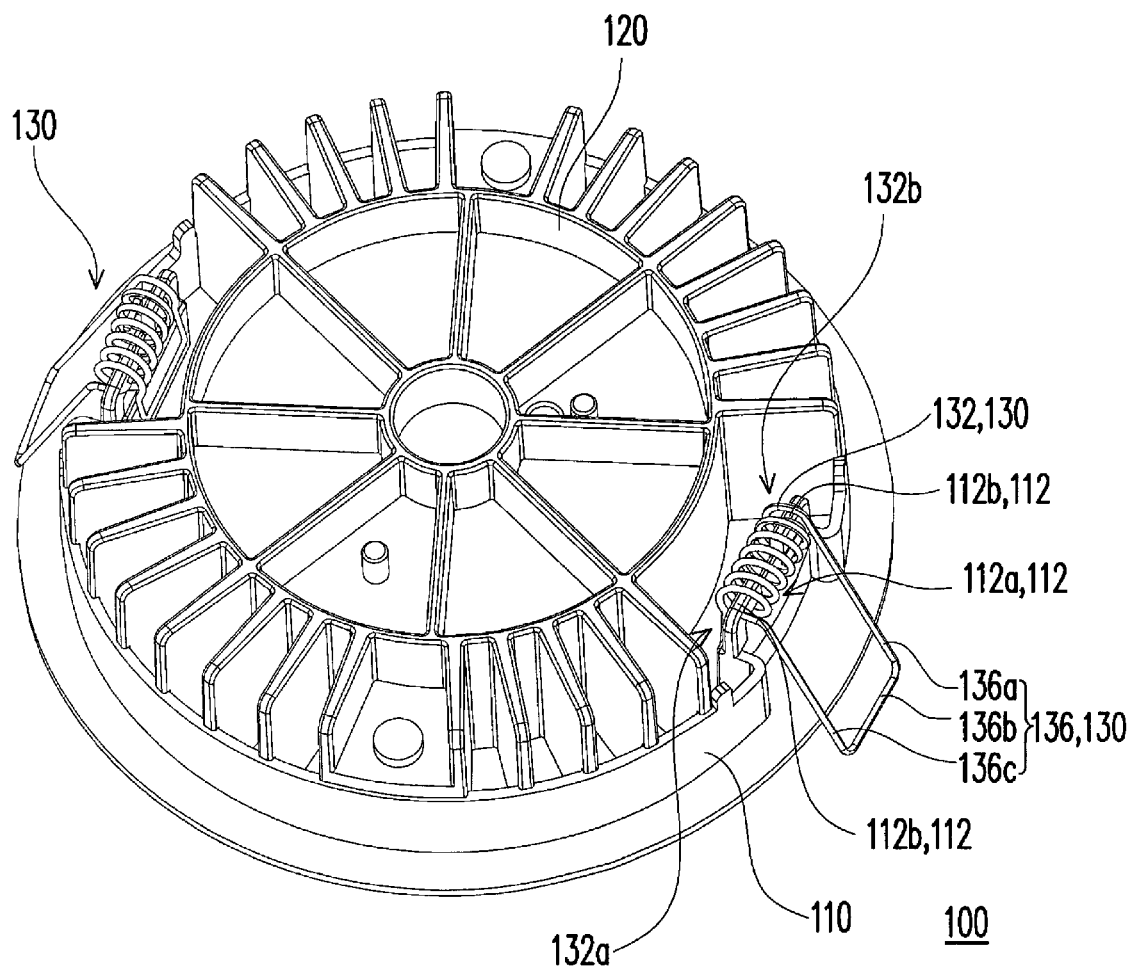
FIG. 1 illustrates a perspective view of a lamp according to one embodiment of the present invention.
Figure 2:
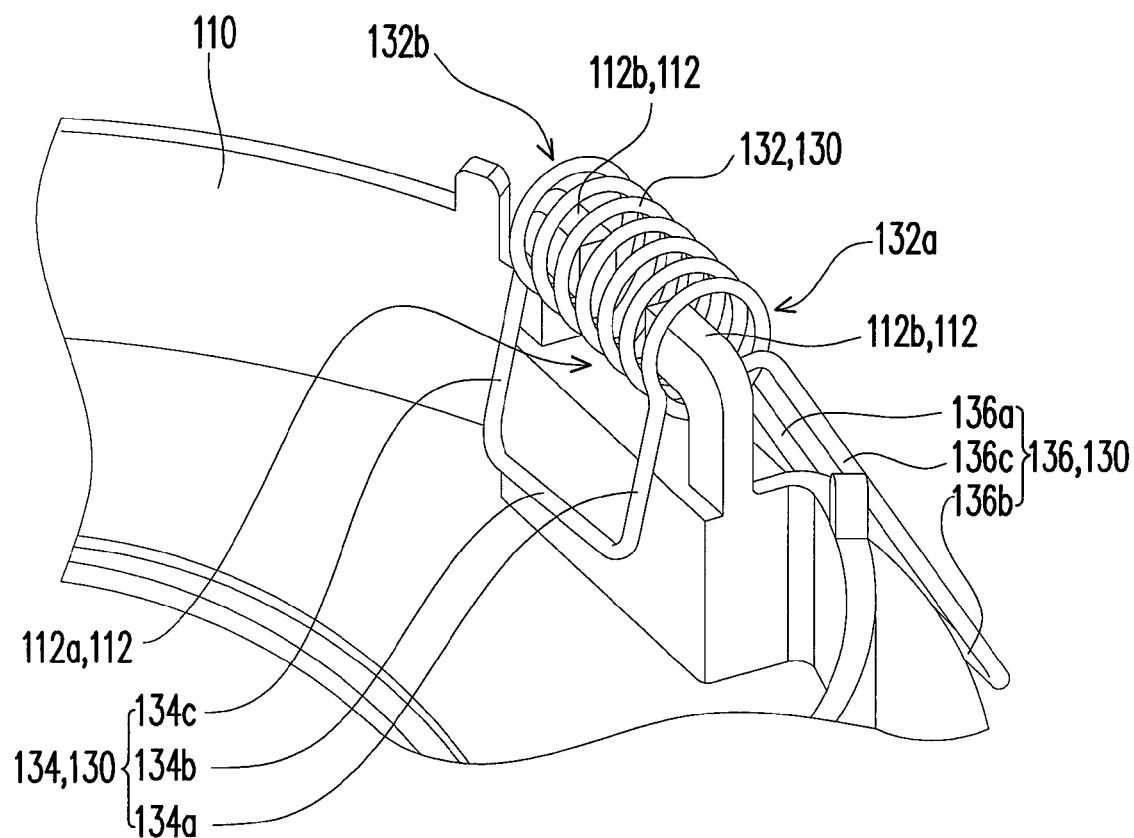
FIG. 2 is a perspective view showing a partial structure of the lamp in FIG. 1.
Figure 3:
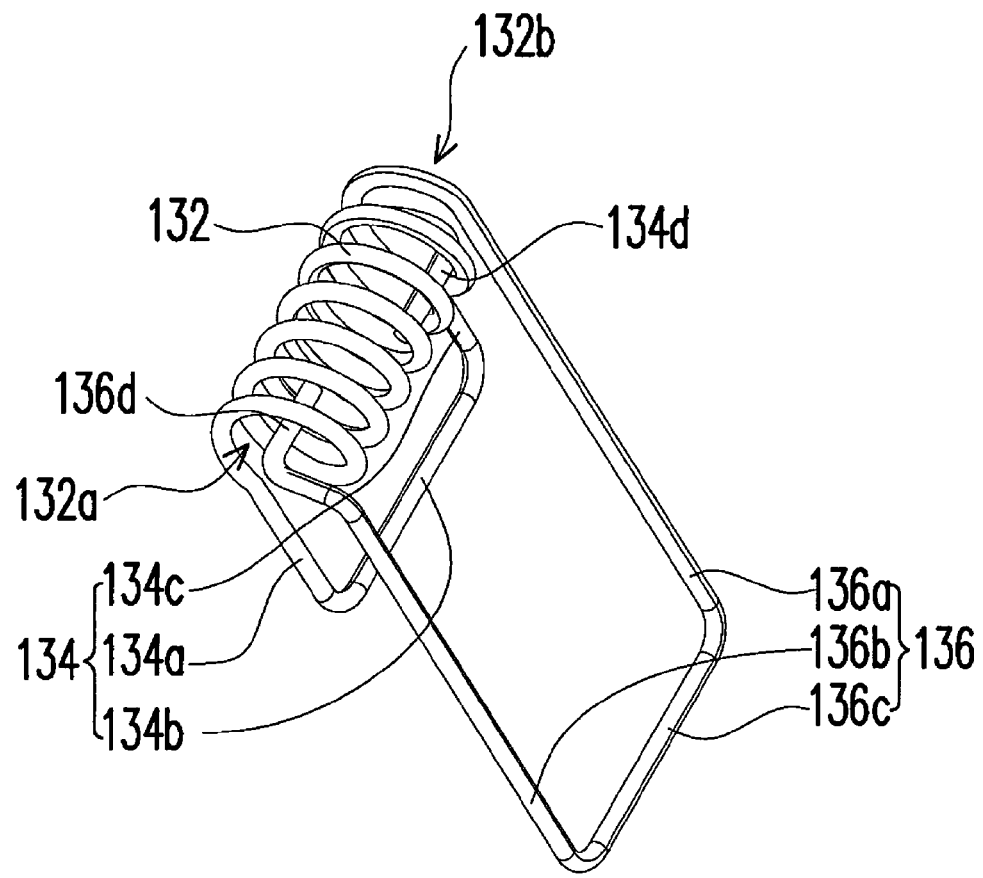
FIG. 3 is a perspective view of a torsion spring in FIG. 1.

FIG. 1 illustrates a perspective view of a lamp according to one embodiment of the present invention. FIG. 2 is a perspective view showing a partial structure of the lamp in FIG. 1. FIG. 3 is a perspective view of a torsion spring in FIG. 1. Referring to FIG. 1 to FIG. 3, according to this embodiment, a lamp 100 includes a shell 110, a main body 120, and at least a torsion spring 130 (two are illustrated). The shell 110 includes an assembling portion 112. The assembling portion 112 has a notch 112a and two protrusions 112b extending from two opposite inner sides of the notch 112a. The main body 120 is disposed inside the shell 110.

The torsion spring 130 includes a spring body 132, a first supporting part 134, and a second supporting part 136. The spring body 132 has a first end portion 132a and a second end portion 132b corresponding thereto and is assembled to the assembling portion 112 of the shell 110 by the first end portion 132a and the second end portion 132b respectively fitting the two protrusions 112b. The first supporting part 134 includes a first arm 134a, a first bending part 134b, and a second arm 134c. The first arm 134a extends from the first end portion 132a of the spring body 132. The first bending part 134b extends from an end of the first arm 134a that is away from the spring body 132. The second arm 134c extends from an end of the first bending part 134b, which is away from the first arm 134a, to the second end portion 132b of the spring body 132.

The second supporting part 136 has a structure similar to the first supporting part 134. The second supporting part 136 includes a third arm 136a, a second bending part 136b, and a fourth arm 136c. The third arm 136a extends from the second end portion 132b of the spring body 132. The second bending part 136b extends from an end of the third arm 136a that is away from the spring body 132. The fourth arm 136c extends from an end of the second bending part 136b, which is away from the third arm 136a, to the first end portion 132a of the spring body 132.

Figure 4:
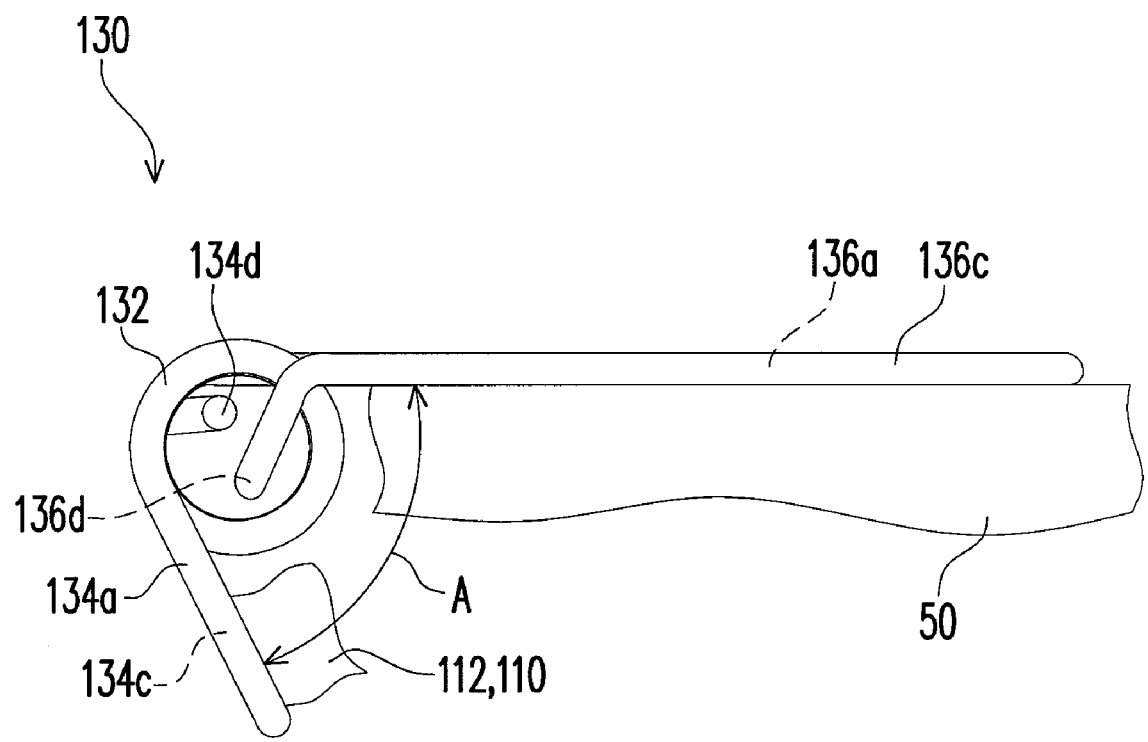
FIG. 4 is a partial lateral view showing the lamp in FIG. 1 fixed onto a fixing end.

FIG. 4 is a partial lateral view illustrating the lamp in FIG. 1 fixed onto a fixing end. Referring to FIG. 4, according to this embodiment, the lamp 100 (as shown in FIG. 1) is adapted to be fixed to a fixing end 50, which is for example a part of the ceiling or wall of a building. When the fixing end 50 and the assembling portion 112 of the shell 110 are positioned between the first supporting part 134 and the second supporting part 136, the first arm 134a and the second arm 134c tightly clamp the assembling portion 112 by the force of the spring body 132, and the third arm 136a and the fourth arm 136c tightly clamp the fixing end 50 also by the force of the spring body 132.

That is, to fix the lamp 100 (as shown in FIG. 1) to the fixing end 50, the user pulls against the force of the spring body 132 to separate the first supporting part 134 and the second supporting part 136 to an angle A. Then, the first supporting part 134 and the second supporting part 136 respectively lean against the assembling portion 112 and the fixing end 50 as illustrated in FIG. 4, and tightly clamp the assembling portion 112 and the fixing end 50 by the force of the spring body 132, so as to fix the lamp 100 to the fixing end 50. With reference to FIG. 1 and FIG. 4, it is noted that the lamp 100 as described in this embodiment has two torsion springs 130, and the two torsion springs 130 are located on two opposite sides of the lamp. The two torsion springs 130 simultaneously clamp the fixing end 50 and the shell 110, so as to stabilize the lamp 100 on the fixing end 50.

Further referring to FIG. 2 and FIG. 3, according to this embodiment, the first supporting part 134 and the second supporting part 136 of the torsion spring 130 both have two arms (the first supporting part 134 has the first arm 134a and the second arm 134c, and the second supporting part 136 has the third arm 136a and the fourth arm 136c), and these arms can be easily pulled open by the hands of the user. Therefore, the user does not require any fixtures to complete assembling the torsion spring 130 to the assembling portion 112 of the shell 110.

The structure of the torsion spring according to this embodiment is further described as follows. Referring to FIG. 3, according to this embodiment, the first arm 134a and the second arm 134c are substantially parallel to each other and substantially perpendicular to the first bending part 134b. The third arm 136a and the fourth arm 136c are substantially parallel to each other and substantially perpendicular to the second bending part 136b. Moreover, the second supporting part 136 further includes an extending arm 136d connected to an end of the fourth arm 136c that is away from the second bending part 136b, and the extending arm 136d extends from the first end portion 132a into the spring body 132. The first supporting part 134 further includes an extending arm 134d connected to an end of the second arm 134c that is away from the first bending part 134b, and the extending arm 134d extends from the second end portion 132b into the spring body 132.

The aforesaid extending arms 134d and 136d are substantially perpendicular to the second arm 134c and the fourth arm 136c respectively and extend into the spring body 132. The structure of the extending arms 134d and 136d and the spring body 132 restricts the movable ranges of the second arm 134c and the fourth arm 136c near the ends of the spring body 132, thereby reducing the possibility of bending and damaging the torsion spring 130 due to an improper outer force.

To sum up, the lamp as described in the embodiments of the present invention includes the torsion spring with two supporting parts which both have two arms for balancing the load of stress and providing better structural strength. The arms of the supporting parts can be directly and easily pulled open by the user. Hence, the assembly of the lamp is made easier. Moreover, the torsion spring further includes the extending arms, which are connected to the arms and extend into the spring body. The structure of the extending arm and the spring body prevents the torsion spring from being bent and damaged by an improper outer force.

Although the present invention has been disclosed by the above embodiments, they are not intended to limit the present invention. Any person having ordinary skill in the art may make modifications and variations without departing from the spirit and scope of the present invention. Therefore, the scope of protection sought by the present invention falls in the appended claims.

What is claimed is:

1. A torsion spring adapted for fixing a shell having an assembling portion onto a fixing end, the torsion spring comprising:
    a spring body having a first end portion and a second end portion opposite to the first end portion and assembled to the assembling portion;
    a first supporting part, comprising:
    a first arm extending from the first end portion of the spring body;
    a first bending part extending from an end of the first arm that is away from the spring body;
    a second arm extending from an end of the first bending part, which is away from the first arm, to the second end portion of the spring body;
    a second supporting part, comprising:
    a third arm extending from the second end portion of the spring body;
    a second bending part extending from an end of the third arm that is away from the spring body; and
    a fourth arm extending from an end of the second bending part, which is away from the third arm, to the first end portion of the spring body, wherein the first arm and the second arm tightly clamp the assembling portion by the force of the spring body, and the third arm and the fourth arm tightly clamp the fixing end by the force of the spring body when the fixing end and the assembling portion of the shell are positioned between the first supporting part and the second supporting part, wherein the third arm, the second bending part and the fourth arm are located at one side of the assembling portion, and the first arm, the first bending part and the second arm are located at another side of the assembling portion.

2. The torsion spring as claimed in claim 1, wherein the first arm and the second arm are substantially parallel to each other and are substantially perpendicular to the first bending part.

3. The torsion spring as claimed in claim 1, wherein the third arm and the fourth arm are substantially parallel to each other and are substantially perpendicular to the second bending part.

4. The torsion spring as claimed in claim 1, wherein the first supporting part further comprises an extending arm connected to an end of the second arm that is away from the first bending part, and the extending arm extends from the second end portion of the spring body into the spring body.

5. The torsion spring as claimed in claim 4, wherein the extending arm is substantially perpendicular to the second arm.

6. The torsion spring as claimed in claim 1, wherein the second supporting part further comprises an extending arm connected to an end of the fourth arm that is away from the second bending part, and the extending arm extends from the first end portion of the spring body into the spring body.

7. The torsion spring as claimed in claim 6, wherein the extending arm is substantially perpendicular to the fourth arm.

8. A lamp adapted to be fixed onto a fixing end, the lamp comprising:
    a shell having an assembling portion, wherein the assembling portion has a notch and two protrusions extending from two opposite inner sides of the notch;
    a main body disposed in the shell;
    a torsion spring, comprising:
    a spring body having a first end portion and a second end portion opposite to the first end portion, wherein the first end portion and the second end portion are respectively fit the two protrusions, so as to assemble the spring body to the assembling portion;
    a first supporting part, comprising:
    a first arm extending from the first end portion of the spring body;
    a first bending part extending from an end of the first arm that is away from the spring body;
    a second arm extending from an end of the first bending part, which is away from the first arm, to the second end portion of the spring body;
    a second supporting part, comprising:
    a third arm extending from the second end portion of the spring body;
    a second bending part extending from an end of the third arm that is away from the spring body; and
    a fourth arm extending from an end of the second bending part, which is away from the third arm, to the first end portion of the spring body, wherein the first arm and the second arm tightly clamp the assembling portion by the force of the spring body, and the third arm and the fourth arm tightly clamp the fixing end by the force of the spring body when the fixing end and the assembling portion of the shell are positioned between the first supporting part and the second supporting part, wherein the third arm, the second bending part and the fourth arm are located at one side of the assembling portion, and the first arm, the first bending part and the second arm are located at another side of the assembling portion.

9. The lamp as claimed in claim 8, wherein the first arm and the second arm are substantially parallel to each other and are substantially perpendicular to the first bending part.

10. The lamp as claimed in claim 9, wherein the second supporting part further comprises an extending arm connected to an end of the fourth arm that is away from the second bending part, and the extending arm extends from the first end portion of the spring body into the spring body.

11. The lamp as claimed in claim 10, wherein the extending arm is substantially perpendicular to the fourth arm.

12. The lamp as claimed in claim 8, wherein the third arm and the fourth arm are substantially parallel to each other and are substantially perpendicular to the second bending part.

13. The lamp as claimed in claim 8, wherein the first supporting part further comprises an extending arm connected to an end of the second arm that is away from the first bending part, and the extending arm extends from the second end portion of the spring body into the spring body.

14. The lamp as claimed in claim 13, wherein the extending arm is substantially perpendicular to the second arm.

* * * * *